A. C. VAIL.
PNEUMATIC SPRING FOR VEHICLES.
APPLICATION FILED JULY 18, 1910.
1,029,644.
Patented June 18, 1912.
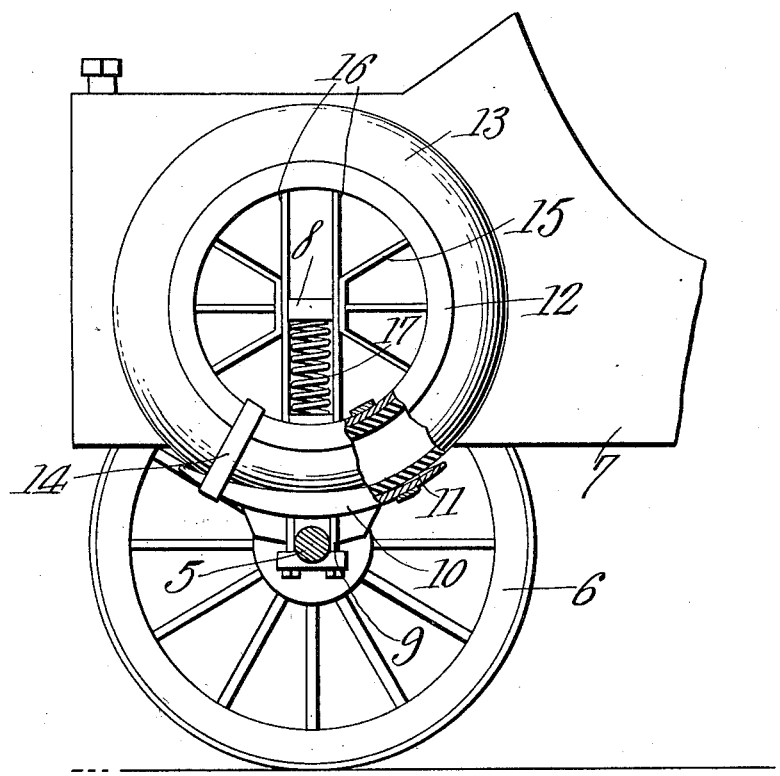
Witnesses
Arthur C. Vail,
Inventor
by C. A. Snow & Co.
Attorneys

UNITED STATES PATENT OFFICE.

ARTHUR C. VAIL, OF SELAH, WASHINGTON.

PNEUMATIC SPRING FOR VEHICLES.

1,029,644.  Specification of Letters Patent.  Patented June 18, 1912.

Application filed July 18, 1910. Serial No. 572,627.

*To all whom it may concern:*

Be it known that I, ARTHUR C. VAIL, a citizen of the United States, residing at Selah, in the county of Yakima and State of Washington, have invented a new and useful Pneumatic Spring for Vehicles, of which the following is a specification.

It is the object of the present invention to provide an improved construction of pneumatic spring for vehicles and the invention relates more particularly to the type of such devices which embody an axle carried saddle and a frame surrounded by a cushion which rests in said saddle and which frame supports the vehicle body, and it is one aim of the present invention to yieldably support the vehicle body upon the several frames as well as to support the cushions of the several frames yieldably upon the axle carried saddles so that not only will the pneumatic cushions be relieved of wear and strain to a considerable degree, but an additional cushioning effect will be produced.

A further aim of the invention is to so construct the saddle in which the cushion rests that the cushion, when compressed, will not be cut by the saddle.

With the above and other objects in view, the invention consists in the construction and arrangement of parts shown in the accompanying drawings, in which, the figure is a view in side elevation, parts being shown in section, of the fore part of a vehicle such as an automobile, illustrating the invention applied thereto.

In the drawings, the vehicle axle is indicated by the numeral 5 and mounted upon the axle is an ordinary metal tired wheel 6. The body of the machine is illustrated by the numeral 7 and, for a purpose to be presently explained, there projects from each side of the said body 7, an arm which is indicated by the numeral 8.

Inasmuch as one pneumatic spring device of the present invention is located at each corner of the vehicle, it will be necessary only to describe one of such devices, they being merely duplicated at each of the points mentioned. Secured upon the axle 5 near one end thereof and inwardly of the adjacent wheel 6, by means of suitable clips 9, is a saddle indicated by the numeral 10. This saddle 10 is concaved transversely and longitudinally and its upper side or more specifically that side upon which the cushion element of the device rests, extends in the arc of a circle, this side being indicated by the numeral 11.

The invention embodies an annular frame 12 which is peripherally grooved or concaved transversely and has fitted in its grooved periphery a pneumatic cushion 13 resembling an ordinary pneumatic tire. The cushion 13 is disposed in the concavity of the saddle 10 as illustrated in the drawings and is held in this position by suitable clips 14 which embrace the ends of the saddle, the sides of the cushion, and the inner peripheral surface of the frame 12. From the drawings it will be observed that the exterior diameter of the cushion 13 is less than that of the circle of which the line of curvature of the upper surface of the saddle 10 is an arc so that normally, or in other words, when the cushion is not subjected to any considerable pressure, the upper surface of the saddle at the ends thereof will be slightly spaced from that portion of the cushion which is received in the concavity of the saddle. However, when pressure is applied to the cushion, as for example when the vehicle contains several passengers, the cushion will be flattened to a greater or less degree at its said portion so that it will actually contact with the said upper surface of the saddle at the end thereof. However, the spacing of the saddle at its ends from the cushion under normal conditions, obviates cutting of the cushion when the frame is compressed as just described.

Supported, in parallel relation and vertically in the frame 12 by means of suitable braces 15, are guides indicated by the numeral 16 and fitted between these guides is the end of the arm 8 which projects laterally from the vehicle body 7, this arm being freely slidable between the said guides 16. A spring indicated by the numeral 17 is disposed beneath the arm 8 and rests at its lower end upon the frame 12.

From the foregoing, it will be readily understood that not only is the vehicle body cushioned with respect to the wheels 6 through the instrumentality of the pneumatic cushion 13, but also, the body is cushioned with respect to the frame 12 through the instrumentality of the spring 17 so that not only is the cushion 13 relieved, to a considerable extent, of wear and strain, but also, an additional cushioning effect is produced.

What is claimed is:—

1. In a device of the character described, the combination with a vehicle-body and an axle, of a saddle having an upper curved surface and borne by said axle, a pneumatic cushion secured upon said saddle, the exterior diameter of said cushion being less than that of the circle of which the line of curvature of said upper surface of said saddle is an arc, an annular frame arranged within said cushion, parallel vertical guides fixed in said frame, a slide projecting from said vehicle-body, and working between said guides, and a resilient member intermediate said guides and supporting said slide.

2. A device of the character described, including a vehicle-body, an axle for the latter, a saddle fixed to said axle, a circular pneumatic cushion resting upon said saddle, a circular frame arranged within said pneumatic cushion, parallel vertical guide-bars fixed within said frame, an outstanding arm fixed to said vehicle-body and received and slidable between parallel vertical guide-bars, a resilient member forming a cushion for said outstanding arm, braces secured within said circular frame and to said guide bars, and clips engaging said circular frame, said pneumatic cushion and said saddle.

In testimony that I claim the foregoing as my own, I have hereto affixed my signature in the presence of two witnesses.

ARTHUR C. VAIL.

Witnesses:
J. H. NEEDHAM,
INEZ HILLEY.

---

Copies of this patent may be obtained for five cents each, by addressing the "Commissioner of Patents, Washington, D. C."